Figure 1:
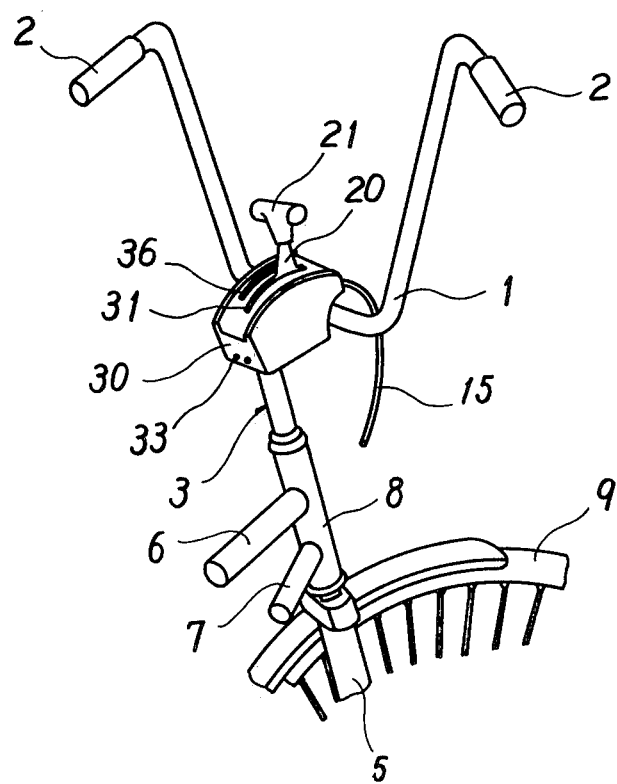

United States Patent [19]

Nakamura et al.

[11] 4,189,954
[45] Feb. 26, 1980

[54] SPEED CONTROL DEVICE FOR A BICYCLE

[75] Inventors: Yoshihiko Nakamura; Masashi Nagano, both of Sakai, Japan

[73] Assignee: Shimano Industrial Company, Limited, Osaka, Japan

[21] Appl. No.: 839,457

[22] Filed: Oct. 4, 1977

[30] Foreign Application Priority Data

Nov. 4, 1976 [JP] Japan .............. 51-149402[U]

[51] Int. Cl.$^2$ ............................................. G05G 11/00
[52] U.S. Cl. ..................................... 74/488; 74/501 K
[58] Field of Search ............... 74/488, 489, 487, 551.8

[56] References Cited

U.S. PATENT DOCUMENTS

| 2,100,012 | 11/1937 | Mankki | 74/551.1 |
| 2,169,256 | 8/1939 | Kraeft | 74/551.8 X |
| 3,406,587 | 10/1968 | Brilando et al. | 74/487 X |
| 3,443,825 | 5/1969 | Wolf | 74/488 X |
| 3,534,627 | 10/1970 | Schwerdhofer | 74/489 X |
| 3,554,156 | 1/1971 | Kishida et al. | 74/489 X |
| 3,701,546 | 10/1972 | Schwerdhofer et al. | 74/489 X |

FOREIGN PATENT DOCUMENTS 794122 2/1936 France ..................... 74/551.8

*Primary Examiner*—Samuel Scott
*Assistant Examiner*—Wesley S. Ratliff, Jr.
*Attorney, Agent, or Firm*—Stevens, Davis, Miller & Mosher

[57] ABSTRACT

A speed control device for a bicycle, in which a base member is fixed to the upper portion of a handle stem, a mounting member having a rising higher than the upper surface of the handle stem is fixed to the base member, and a speed control lever is pivoted to the rising of the mounting member.

7 Claims, 10 Drawing Figures

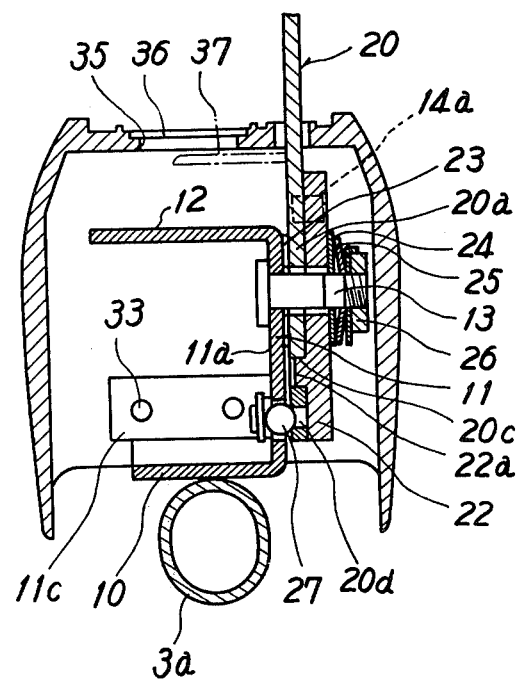
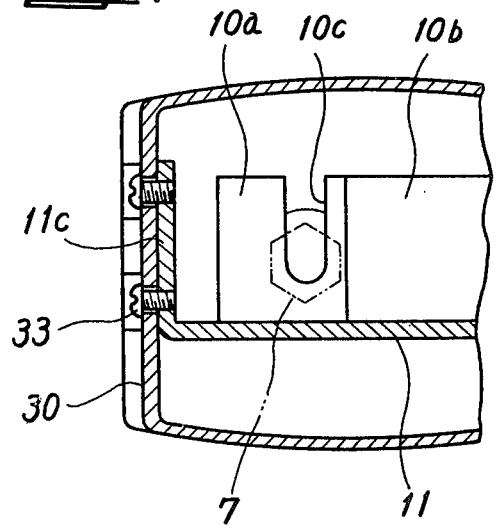

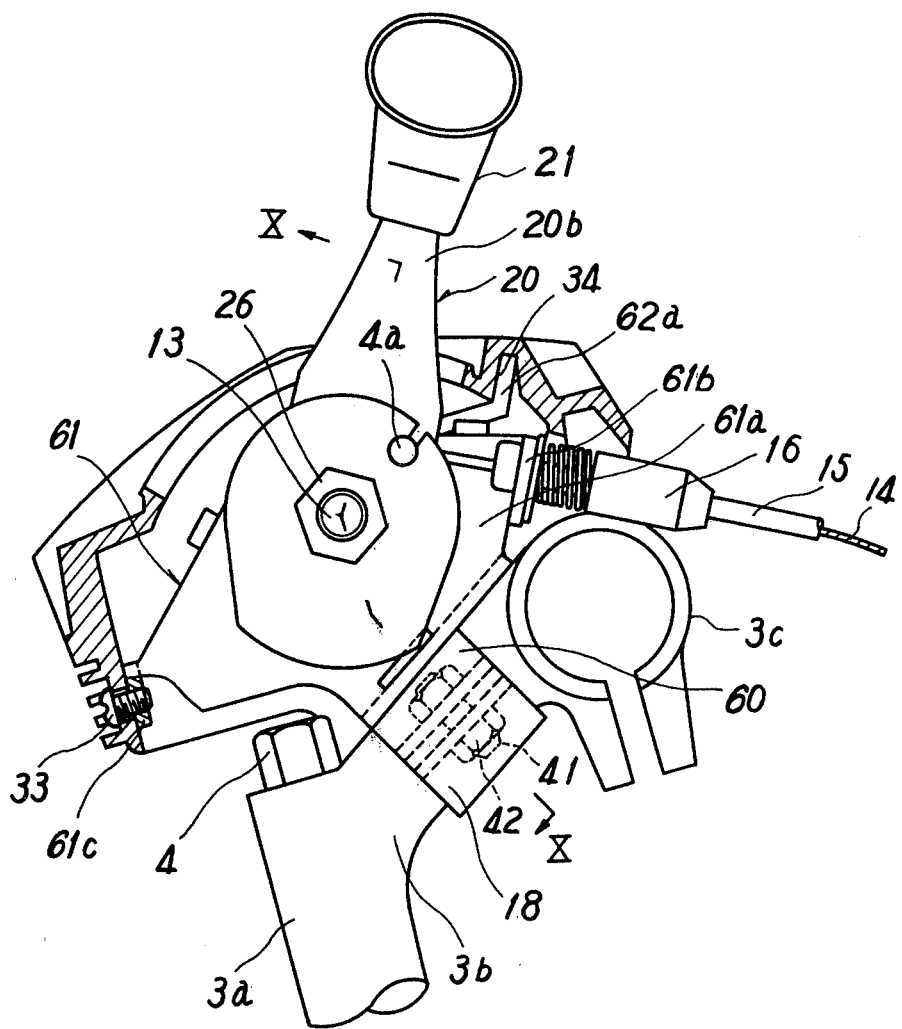

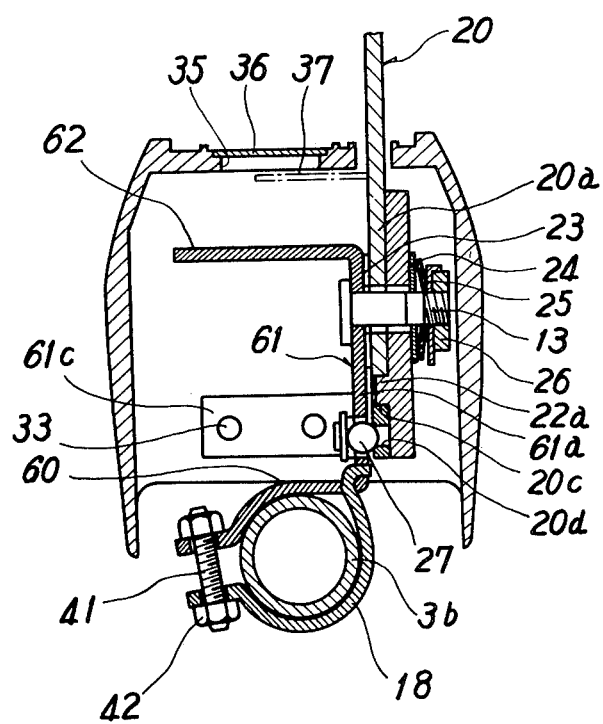

SPEED CONTROL DEVICE FOR A BICYCLE

This invention relates to a speed control device for a bicycle, and more particularly to a speed control device mainly suitable for the bicycle of the so-called up-handle type in which handle grips are vertically located higher than the handle lug.

Conventionally, the speed control device used for the bicycle of this type has a control lever attached to a top tube of the bicycle. Such a control lever is located in advance of the saddle of the bicycle, so that when the bicycle collides with another object the cyclist is forced forward off of the saddle to hit the lever and be injured.

Also, some conventional bicycles have the speed control lever attached to the handle bar or handle stem body. When the bicycle is of the so-called up-handle type a cyclist handles the lever in an unnatural posture in the bicycle's running, thereby losing some control over the operation of the bicycle. Thus, safety in running of the bicycle becomes a matter of great concern.

In view of the abovementioned problems, this invention has been designed. A main object of the invention is to provide a speed control device by which the cyclist can handle the speed control lever in a natural posture when he rides a bicycle with high handle grips, and by which he will not be injured by contact with the lever should the bicycle happen to collide with another object. Thus safety in the bicycle's running is improved. Another object of the invention is to provide a speed control device wherein the speed change stage is readily and accurately readable and the speed is safely and easily changeable.

This invention is characterized in that a base plate fixed to the upper portion of the handle stem is provided with a mounting member rising higher than the upper surface of the handle stem, and a control lever is pivotally supported to the mounting member, so that the control lever may be operable in a swinging motion in the longitudinal direction of the bicycle body.

In addition, it is to be noted that the handle stem comprises a stem body of a straight tube-like shape and a handle lug projecting laterally from the upper portion of the stem body. The handle lug is provided at its top with a supporting portion for the handle bar, the supporting portion being higher, lower than, or equal to the uppermost end of the stem body, where the upper surface of the handle stem means the upper surface of handle lug and that of the supporting portion, including the uppermost end of the stem body.

Figure 2:
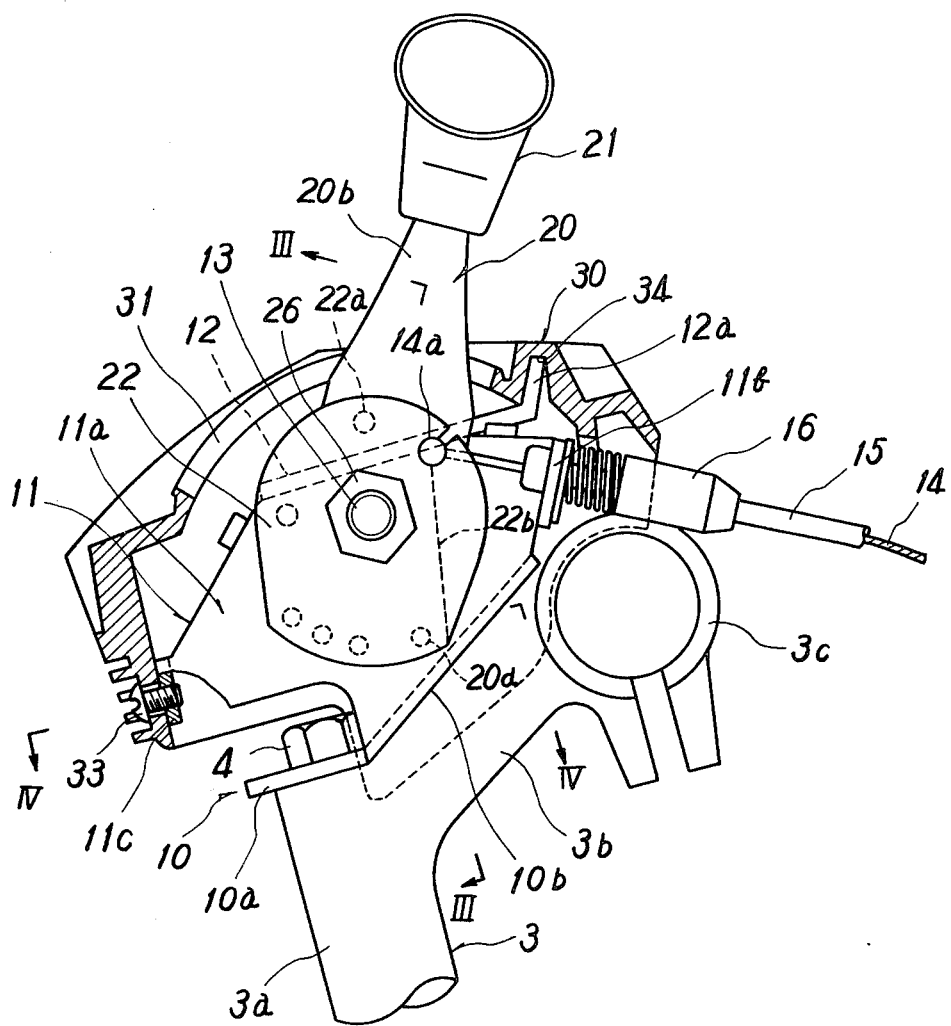
Figure 5:
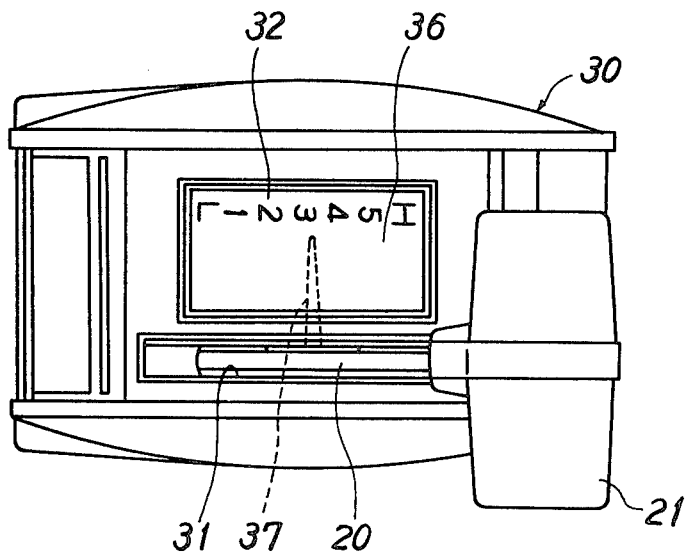
Figure 6:
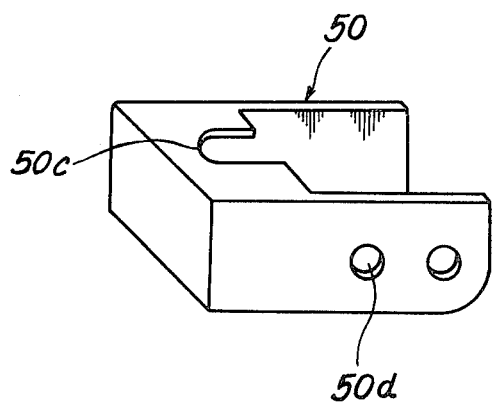
Figure 7:
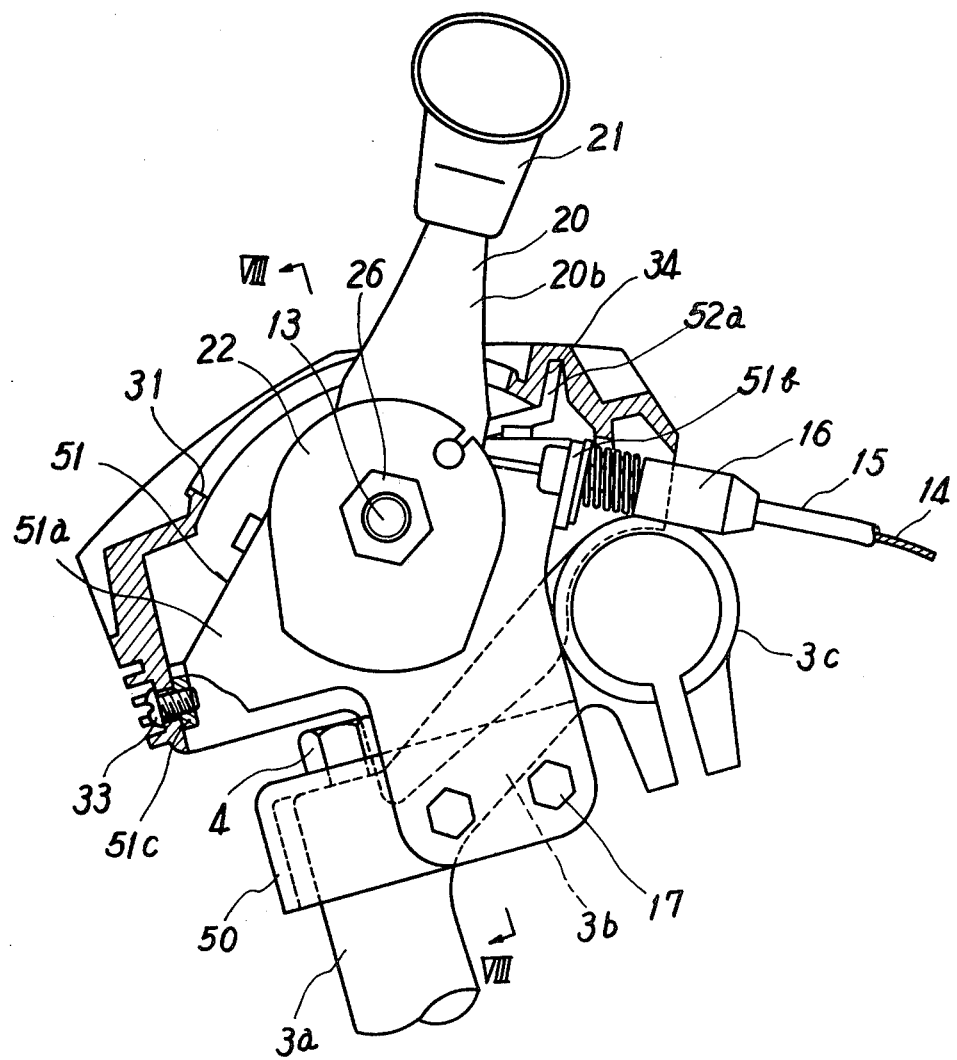
Figure 8:
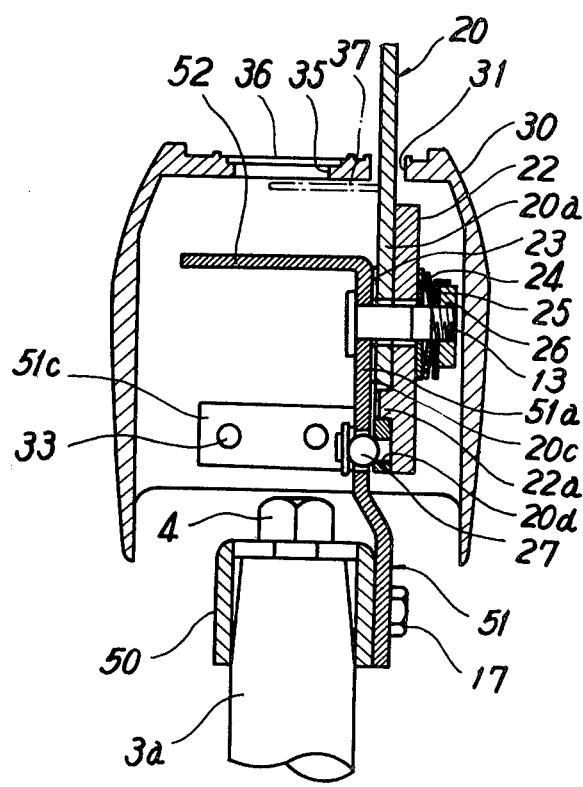

The above and other objects and features of the invention will appear more fully hereinafter from a consideration of the following description of the embodiment taken in connection with the accompanying drawings, in which:

FIG. 1 is a perspective view of the speed control device of the invention, applied to the bicycle, FIG. 2 is a side view thereof with a cutaway cover of one embodiment of the invention, FIG. 3 is a sectional view taken on Line III—III in FIG. 2, FIG. 4 is a sectional view taken on Line IV—IV in FIG. 2, FIG. 5 is a plan view of the embodiment, FIG. 6 is a perspective view of a fitting of a second embodiment of the invention, FIG. 7 is a side view of a second embodiment with a cutaway cover, FIG. 8 is a sectional view taken on Line VIII—VIII in FIG. 7, FIG. 9 is a side view thereof with a cutaway cover of a third embodiment of the invention, and FIG. 10 is a sectional view taken on Line X—X in FIG. 9.

Referring to FIG. 1, the speed control device of the invention is applied to the bicycle of the so-called up-handle type in which grips 2 of a handle bar 1 are vertically higher than the uppermost end of the handle stem 3. The handle stem 3, as shown in FIG. 2, is provided at the uppermost end thereof with a base member 10 to which is fixed a mounting member 11 having a rising 11a lifted from the uppermost end of the handle stem 3, and to the mounting member 11 is pivoted a control lever 20 for controlling a control wire, the control lever 20 having at its tip a knob 21.

The handle bar 1, as shown in FIG. 2, is fixed to a handle lug 3b extending slantly upwardly of the upper portion of a body 3a of the handle stem 3, through a support 3c of a tubular shape provided at the foremost end of the handle lug 3b, and the handle stem 3 is fixed to a front fork 5 through an expansion bolt 4 as shown in FIG. 2. The handle stem 3 and the front fork 5 carrying it are rotatably supported to a head pipe 8 to which a top tube 6 and a down tube 7 are fixed as shown in FIG. 1, so that the handle bar 1 may steer a front wheel 9 supported by the front fork 5.

In the embodiment shown in FIG. 2, the base member 10 comprises a flat portion 10a parallel to the uppermost end of the stem body 3a and an upwardly slanting portion 10b extending along the upper surface of the handle lug 3b. The parallel flat portion 10a is provided with a one-end-open slot 10c and the slant flat portion 10b is flat and extends upright at its widthwise one end to be formed integrally with the plate-like mounting member 11. The rising 11a of the mounting member 11 is provided with a bore through which a pivot 13 is inserted to pivotally support the control lever 20, and is bent at the front end to form a support tongue 11b and at the rear end to form an arm 11c. The support tongue 11b supports an end piece 16 holding a terminal of an outer cable 15 sheathing therein the control wire 14. The arm 11c mounts a cover 30 to be hereinafter described.

The rising 11a extends from its upper edge parallel to the flat portion 10a so as to form an upper plate 12 which is bent at its front end to form a hook 12a for holding the cover 30.

The base member 10 constituted as aforesaid is fixed to the handle stem 3 by inserting slot 10c around the shank of bolt 4 and beneath the head of the expansion bolt 4 projecting from the uppermost end of the handle stem body 3a and tighten down on the bolt.

The base member 10, mounting member 11 and upper plate 12, take the form of a bent plate of U-like shape, but the mounting member 11 may be separated from the base member so as to be fixed thereto by welding and other fixing methods as shown in FIGS. 6 through 8.

In this instance, the base member is formed of a substantially U-shaped frame as shown in FIG. 6 and has at one side threaded bores 50d and at the upper surface the cutout 50c, so that the mounting member 51 is fixed to the base member 50 through headed bolts 17. Incidentally, the base member is also fixed to the handle stem by the expansion bolt 4 at 50c.

Alternatively, a base member 60 may be fixed to the handle lug in such a manner that a portion of the base member is curved correspondingly to the outer periphery of the handle lug 3b and a separate band 18 (FIGS. 9 and 10) opposite to the curved portion is hooked to the base member 60, and then the base member 60 and the separate band 18 are diametrically contracted by a bolt 41 and a nut 42 so as to sandwich the handle lug 3b therebetween. Also, in this constitution the handle lug 3b may be replaced by the stem body 3a.

In brief, it is enough for the base members 10, 50 and 60 to be fixed to the upper portion of handle stem 3 and also for the mounting members 11, 51 and to be raised higher than the uppermost end of the handle stem 3, thus, the fixation and construction of the base members 10, 50 and 60 are not particularly defined.

The control lever 20 is composed of a base 20a having at its center a bore through which the pivot 13 is inserted and of a lever body 20b radially outwardly extending from the base 20a pivotable relative to the abovementioned mounting member 11 through the pivot 13.

In this instance, the pivot 13 is horizontally arranged in parallel to the horizontal line connecting the handle grips 2, 2 at both ends of the handle bar 1 so that the control lever 20 may be pivoted around the pivot 13 in the longitudinal direction of the bicycle body.

The control lever 20 swinging longitudinally of the bicycle body enables the cyclist to handle the lever in his natural posture regardless of which hand he uses, and also accurately and easily read the marks of speed-change stage when represented by letters on the cover to be hereinafter described.

Also, the control lever body 20b is pivoted to the mounting member 11 at the position where the horizontal pivot 13 is higher than the uppermost surface of the handle stem 3 when the base member 10 is fixed to the handle stem, that is, where the pivot 13 is higher than the uppermost end of stem body 3a, the upper surface of the handle lug 3b, or the upper surface of a support which is formed at the foremost end of the handle lug and supports the handle bar 1. Hence, the control lever 20, even when applied to the bicycle of the so-called up-handle type, is less in its vertical displacement with respect to the grips 2 than heretofore, thereby enabling the lever to be operated with safety.

Furthermore, the lever base 20a, as shown in FIG. 3 is pivoted to the mounting member in such a manner that a push plate 22 of synthetic resin is formed to have a nipple 22a engageable with the lever base 20a the nipple 22a is insertably engaged with a recess 20c formed near the edge of the root of the lever base 20a, so that both the lever base 20a and push plate 22 are in close contact with each other, and are insertably mounted to the horizontal pivot 13 through a washer 23 between the mounting member 11 and the lever base 20c. A nut 26 is screwed onto the thread of the horizontal pivot 13 through a washer 24 and a dish spring 25, whereby the lever base 20a is pivotally supported to the mounting member in a swinging motion under the prescribed rotational resistance applied through the compressed dish spring 25.

The push plate 22 and lever base 20a are provided with recesses receiving therein a swollen end piece 14a of the control wire 14 and the push plate 22 has a recess 22b for guiding therethrough the control wire 14 when pulled by turning the lever body 20b.

The lever base 20a is also provided near the periphery thereof with a plurality of recesses 20d arranged in a circle concentric with the rotational center of the lever base, and the mounting member 11 carries a ball 27 resiliently movable to engage with any one of the recesses 20d, so that the engagement of the ball with one of the recesses may maintain the speed change stage resulting from operating the control lever 20.

The speed control device constituted as aforegoing has a cover 30 attached thereto, which will hereinafter be described.

The cover 30 is made mainly from synthetic resin, and is provided at the upper portion thereof with an elongate slot 31 through which the lever body 20b is inserted and with a rectangular window 32 formed along side the slot 31. A transparent plate 36 is fitted to the window 32 so as to be marked with letters representing the speed change stages respectively, and an indicator 37 is attached to the lever base 20a. The cover 30, which is made lengthwise larger than the total length of the stem body 3a and handle lug 3b in the longitudinal direction of the bicycle, covers both the stem body and handle lug entirely, and is abutted at the rear portion against a cover fitting 11c at the mounting member 11 to be fixed to the cover fitting 11c by a mounting screw 33, and is provided at the inside of the front upper portion with a recess 34 insertably engageable with the hook 12a.

Accordingly, the control lever 20 constituted as aforesaid is located above the handle stem 3, thus enabling the cyclist to handle the control lever 20 easily in his natural posture and also confirm the speed change stage readily with the marked letters after the lever operation.

Furthermore, the cover 30 covering the handle stem 3 allows the bicycle to have a better appearance, and shades the expansion bolt 4 and a tight bolt and nut (not shown) at the support 3c of the handle lug 3b, thereby preventing the bolts from being carelessly loosened.

As clearly understood from the aforesaid description, the speed control device of the invention can be located apart from the saddle so that the cyclist is free from contact with the control device when he is forced to move forward by inertia as a result of a collision, thereby preventing the cyclist from being injured, while, the control lever located above the handle stem allows him to handle the control lever with ease when steering the bicycle.

Furthermore, the control lever can be made longer due to its location above the handle stem, thereby enabling the cyclist to operate the lever with a lighter touch.

While preferred embodiments of the invention have been shown and described, the invention is not limited to the specific construction thereof, which is merely exemplified in the specification rather than defined.

What is claimed is:

1. A speed control device for a bicycle which is fixable to a handle bar fixed to a handle lug extending from the upper portion of a handle stem which is fixed to a front fork by an expansion bolt, said speed control device comprising:
    (a) a base member having an open-ended slot fittable around a stud of said expansion bolt so that said base member is fixed to the uppermost end of said handle stem by tightening said bolt,
    (b) a mounting member, fixed to said base member and having a rising higher than the upper surface of said handle stem, and
    (c) a speed control lever, rotatably pivoted to said rising through a horizontal pivot so as to be operable in swinging motion above the handle bar longitudinally of the bicycle body and positioned substantially above the top of the handle stem.

2. The speed control device as set forth in claim 1, wherein said base member and mounting member are integral.

3. The speed control device as set forth in claim 1, wherein said base member and mounting member are separately formed and fixed to each other by fixing means.

4. The speed control device as set forth in claim 1, including a cover mounted to said mounting member to cover said base member and mounting member.

5. The speed control device as set forth in claim 4, wherein said cover is lengthwise larger than the length of said handle stem and handle lug in the longitudinal direction of the bicycle, said cover comprising a slot formed at the upper surface of said cover to be extended lengthwise thereof, said slot being made larger in length than the width of said lever so that said control lever may be swingable along said slot.

6. The speed control device as set forth in claim 5, wherein said cover is marked at its upper surface with letters representing each of the speed change stages along said slot.

7. The speed control device as set forth in claim 5, wherein said cover is provided at the inner surface of the upper portion thereof with a recess and at the inner surface of the rear portion with mounting bores, and said mounting member is provided with a hook entering said recess and a mounting arm opposite to said rear portion of the cover, said hook being inserted into said recess and said mounting arm being abutted against said rear portion, said cover thereby being fixed to said mounting member by means of screws inserted into said mounting bores.

* * * * *